United States Patent [19]

Kowalski et al.

[11] Patent Number: 5,030,666

[45] Date of Patent: Jul. 9, 1991

[54] MULTILOBALS

[75] Inventors: Alexander Kowalski, Plymouth Meeting, Pa.; Joseph J. Wilczynski, Yorba Linda, Calif.; Robert M. Blankenship, Harleysville; Chuen-Shyong Chou, Dresher, both of Pa.

[73] Assignee: Rohm and Haas Company, Philadelphia, Pa.

[21] Appl. No.: 242,668

[22] Filed: Sep. 12, 1988

Related U.S. Application Data

[62] Division of Ser. No. 885,069, Jul. 14, 1986, Pat. No. 4,791,151.

[51] Int. Cl.$^5$ .............................................. C08L 83/00
[52] U.S. Cl. ....................................... 523/201; 525/902
[58] Field of Search ......................... 523/201; 525/902

Primary Examiner—Joseph L. Schofer
Assistant Examiner—Peter D. Mulcahy

[57] ABSTRACT

Binder, coating, and adhesive compositions having surprising film build, flow, leveling, and adhesive wet tack are provided by an aqueous dispersion comprising polymer particles having a central core surrounded by lobes. Also disclosed are the uses and process of preparation of these unique particles.

5 Claims, 5 Drawing Sheets

MULTILOBALS

This is a divisional application of U.S. patent application Ser. No. 885,069 filed on July 14, 1986 now U.S. Pat. No. 4,791,151.

BACKGROUND OF THE INVENTION

1. Field of the Invention

This invention relates to aqueous dispersions of sequentially-produced polymer particles especially useful for binders, coatings, and adhesives, to processes for preparation thereof, and to the uses.

2. Description of the Prior Art

The use of sequential emulsion polymerization to produce dispersions of film-forming core-sheath or core-shell polymer particles is very well known. Many references teach the use of such dispersions in binders, coatings, and adhesives, as film-forming polymers.

The present invention also utilizes sequential emulsion polymerization to produce film-forming binders, coatings and adhesives and non-film forming additives to coatings but, contrary to conventional technology, the particles of this invention are not core-shell or core-sheath or even spherical. We have discovered how to produce particles having a central core surrounded by lobes which we refer to as "multilobals"; and have also discovered how to use this phenomenon to obtain advantages in coating film build, flow, leveling, high shear ("ICI") viscosity, and adhesive wet tack.

We have not been able to find multilobals in the published prior art, nor are we aware of any prior use or sale of multilobals.

We are aware that bumpy, lumpy, or "raspberry" like particles are sometimes present in conventional polymer dispersions in water. We are also aware that dispersions of conventional spherical particles sometimes aggregate to form clusters of elliptical or dumbbell-shaped particles. Our multilobal dispersions are quite different in structure and behavior in binder, coating, or adhesive compositions. Structurally our multilobal particles have a central core surrounded by lobes, the lobes and core having different compositions. In preferred systems our core is swellable upon neutralization and has a difference in composition with the lobe composition defined by an interaction parameter, $X_{C-L}$, greater than 0.05.

One prolific group at Kobe University, let by Masayoshi Okubo, has published many articles over the last twelve years in the field of suspension and emulsion polymerization, and has been especially interested in what they refer to as anomalous and peculiar morphology. See for example Journal of Polymer Science: Polymer Letters Edition, Vol. 20, 45–51 (1982), and Vol. 19, 143 (1981). While some of the Kobe articles show what appear to be lobes, upon closer study we believe the Kobe group is growing hard second stage particles, e.g., styrene within a continuous soft first stage, e.g., butyl acrylate. Since butyl acrylate is transparent to an electron beam, transmission electron microscopy photos of unhardened particles show a bumpy internal morphology. However, the Kobe particles are actually spherical when viewed by optical microscope or even by electron microscope after hardening the particles. Certainly the Kobe materials would not be useful as high film build coating binders or high wet tack adhesives. The Kobe materials are made by a method which is different in many regards from ours, and have a different morphology from our multilobals. Rather than having a central core surrounded by lobes, we believe the Kobe particles have a bumpy core surrounded by a spherical but transparent (to electron beam) shell.

Conventional dispersions generally need a thickener to produce binders, coatings, or adhesives with sufficient film build and ICI viscosity. Typical thickeners used in the art are hydroxyethyl cellulose and synthetic rheology modifiers.

SUMMARY OF THE INVENTION

It is an object of the present invention to reduce or eliminate the need of thickeners or rheology modifiers in film forming dispersion binder, coatings, and adhesives systems.

Another object of the invention is to provide dispersions of polymer particles for binders, coatings, and adhesives which have improved film build at a fixed solids level, or lower solids requirement at a fixed film build.

With respect to adhesives, an object is to provide improved wet tack.

An additional object is to provide dispersions for binders, coatings, and adhesives which are more efficient.

These objects, and others as will become apparent from the following description are achieved by the present invention which in one aspect is an aqueous dispersion comprising polymer particles having a central core surrounded by lobes, useful in binder, coating and adhesive compositions. Another aspect of the invention is use of such compositions in binders, coatings, or adhesives with improved film build at a fixed solids level or lower solids requirement at a fixed film build.

In another aspect the invention is the process of producing such compositions wherein a lobe-forming monomer system forms a polymer which is grown out on a central core particle where the weight ratio of lobe to core is greater than one.

DETAILED DESCRIPTION OF THE INVENTION AND THE PREFERRED EMBODIMENTS

Figure 1:
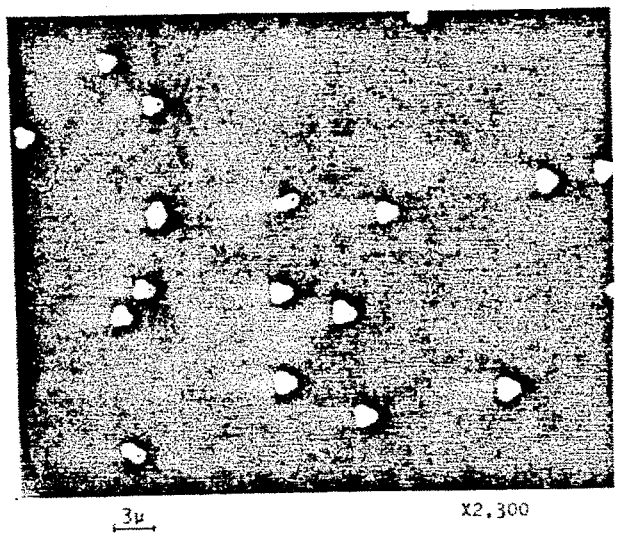
FIG. 1 is a photograph showing the appearance under optical microscope on a dark field of a multilobal dispersion made in a accordance with the invention, prior to swelling.
Figure 2:
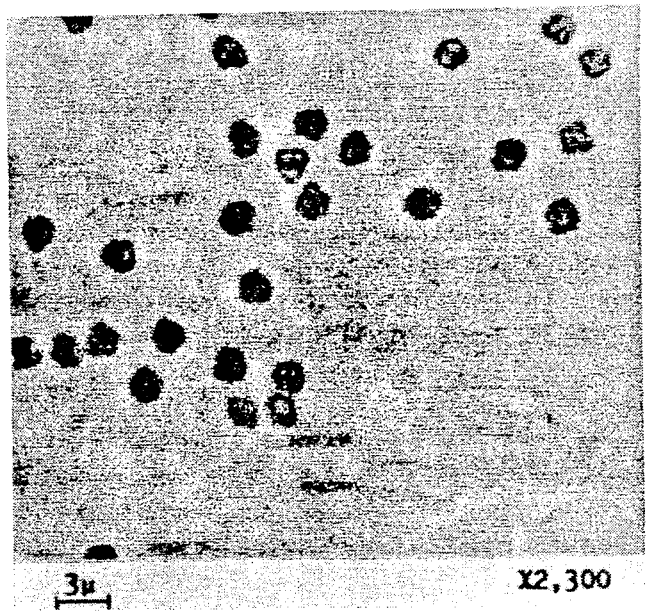
FIG. 2 is a photograph of a multilobal dispersion made in accordance with the invention taken under optical microscope on a bright field.

The dispersions of the invention comprise polymer particles having a central core surrounded by lobes. These lobes are generally observable with an optical microscope, as can be seen in FIGS. 1 and 2. The lobes are also observable with electron microscopy and, as distinguished from the prior art, are observable by scanning electron microscopy after treatment with ruthenium tetraoxide.

Figure 3:
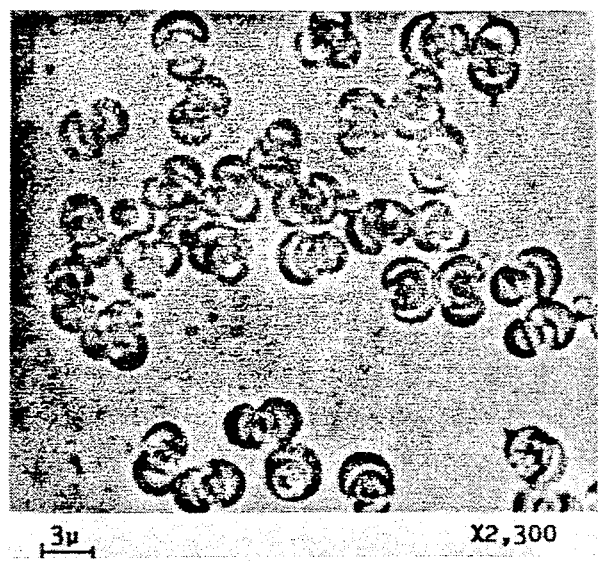
FIG. 3 is a photograph of the appearance of multilobal dispersion made in accordance with the invention and neutralized with ammonia at 85° C. taken under optical microscope on a bright field.
Figure 4:
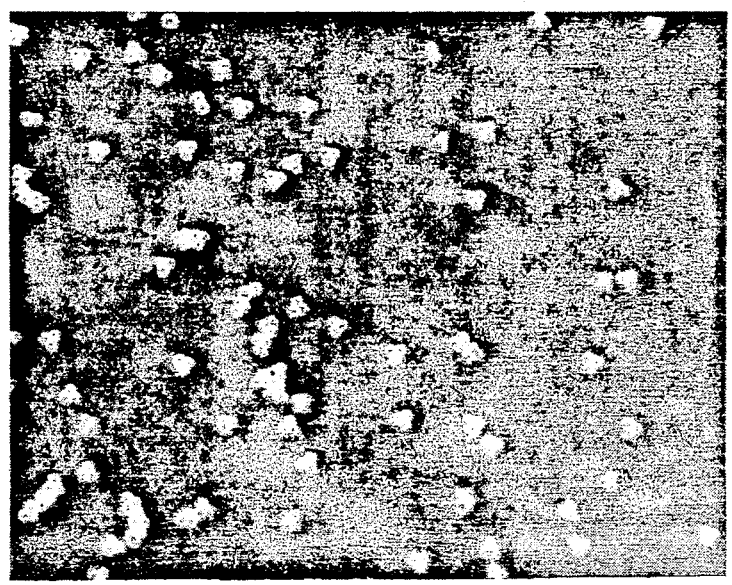
FIG. 4 is the same as FIG. 1 except at a lower light intensity.
Figure 5:
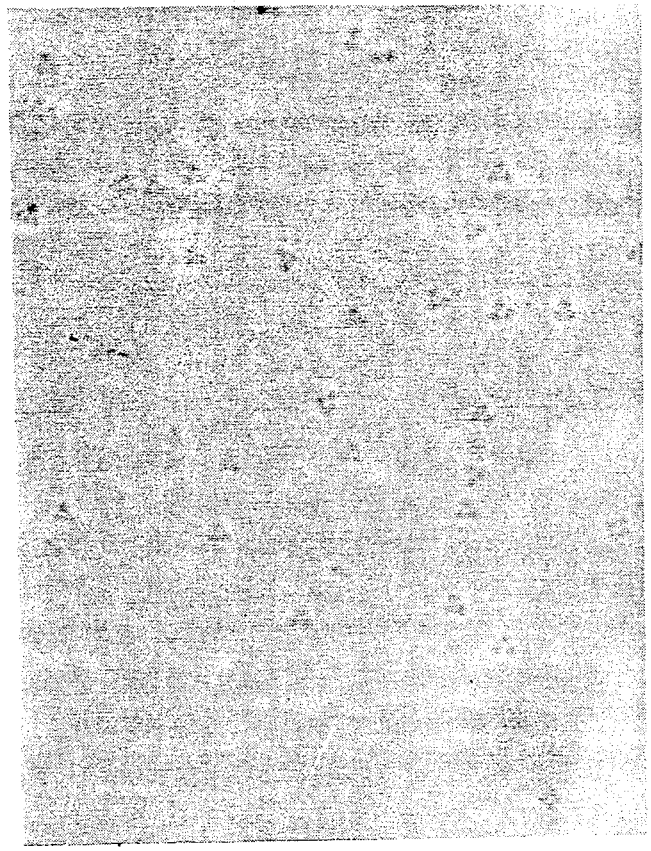
FIG. 5 is similar to FIG. 2 except with smaller particles.
Figure 6:
FIG. 6 is a scanning electron microscope photo of the invention.
Figure 7:
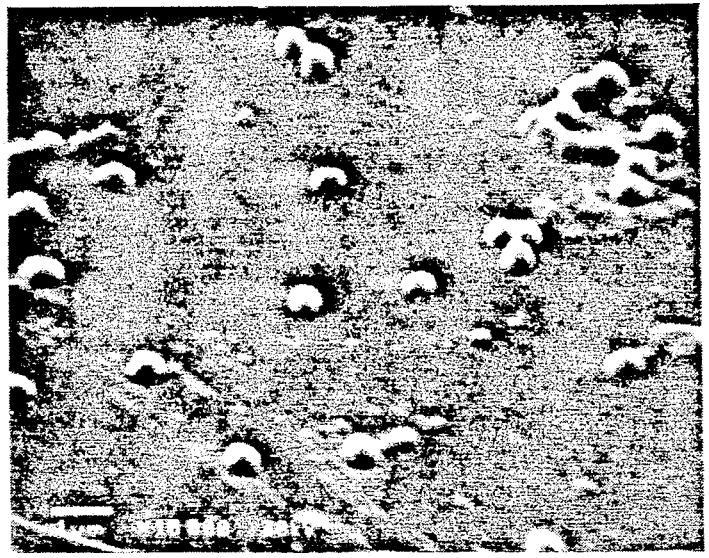
FIG. 7 is a comparative scanning electron microscope of a sample made in accordance with the Kobe articles.
Figure 8:
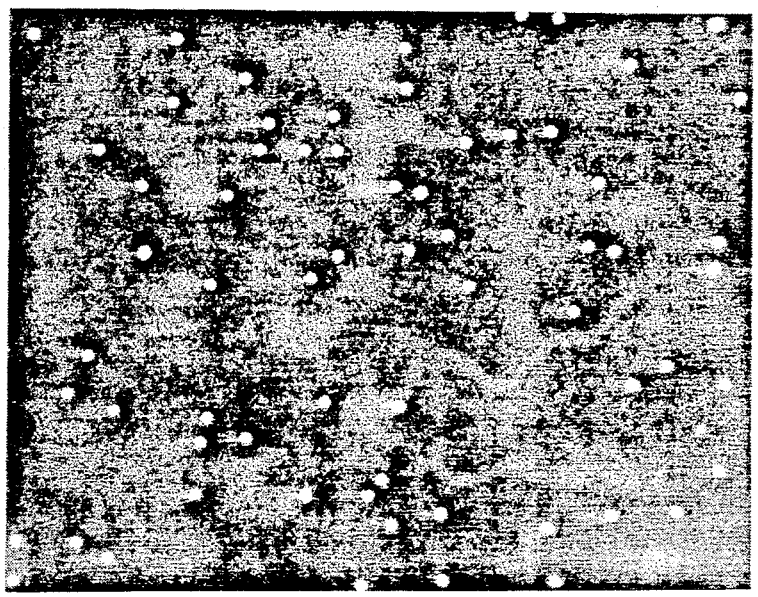
FIG. 8 is a comparative photo showing the Kobe sample under optical microscope.
Figure 9:
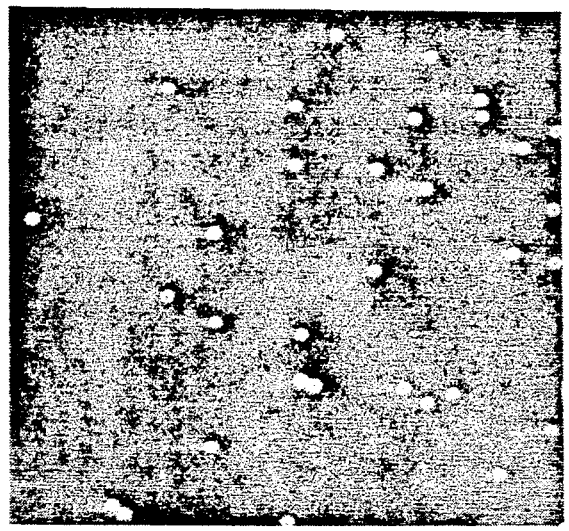
FIG. 9 is a comparative photo showing a standard spherical particle dispersion under optical microscope.
Figure 10:
FIG. 10 is a comparative photo of the Kobe sample under transmission electron microscope, hardened and stained with octadiene/osmium solution.

The preferred particles comprise a central core polymer which swells upon neutralization. The appearance of the swollen particles can be seen in FIG. 3. The lobes are preferably polymerized from a lobe-forming monomer system which is different from the core monomer system. We prefer that the difference between the two monomer systems be such that they form polymers which have an interaction parameter, $X_{C-L}$, with each other of greater than 0.05. The process preferably comprises using sufficient surfactant to maintain the lobe structure, and in the most preferred embodiments the surfactant is continually added during the addition of lobe-forming monomer(s).

A more detailed description of the central core, the formation of lobes, projected uses, particle size ranges, polymerization procedure, surfactants and surfactant concentration, and extensive exemplification thereof follows.

CENTRAL CORE

The core is usually prepared first and may itself be grown out on a seed or preform which may be of a different composition and may be used primarily for control of particle size. The composition of the core is one of the main factors controlling lobe formation. Suitable core monomer systems preferably contain 5% or more of monoethylenically unsaturated monomers which contain one or more functional groups chosen from the following: carboxylic acid, carboxylic acid anhydride, hydroxyl, amide, hydroxyethyl, hydroxypropyl, dihydroxypropyl, hydroxybutyl, ureido, ethylene ureido, hydroxyamide, nitrile, methylolamide, glycidyl, cyanoethyl, N-(isobutoxy methyl) amido, diacetoneamido, N,N-dimethylamido, ethoxy ethyl, ethoxy ethoxy ethyl, furfuryl, aldehyde, phosphate, polyethyleneglycol, polypropylene glycol, sorbitol, glycerol, silane, and the like, with one or more nonionic or nonfunctional monomers. Preferred core monomer systems have about 20 to 50% carboxylic acid functional monomer(s), more preferably about 20 to 40%, and most preferably about 30 to 40%, by weight.

Suitable carboxylic acid monomers include methacrylic acid, acrylic acid, acryloxy propionic acid, methacryloxypropionic acid, acryloxyacetic acid, methacryloxy acetic acid, and monomethyl acid itaconate.

Examples of nonionic or nonfunctional monomers are $C_1$-$C_{18}$ acrylates or methacrylates, vinyl acetate and other vinyl esters, vinyl ethers, vinyl chloride, vinylidene chloride, styrene, substituted styrenes, butadiene, and ethylene. With vinyl acetate, methyl acrylate and other monomers which are relatively water soluble but whose polymers are water insoluble but water plasticized, less than 5% functional monomer may be effective. Homopolymers of vinyl acetate, methyl acrylate and other similar monomers are themselves effective first stages in providing multilobal formation. Examples of similar monomers are methoxy methyl acrylate or methacrylate, cellosolve acrylate or methacrylate, carbitol acrylate or methacrylate, N-vinyl pyrrolidone, hydroxyethyl acrylate or methacrylate, and hydroxypropyl acrylate or methacrylate.

The core polymer system first stage may also contain a small amount of a polyethylenically unsaturated crosslinking monomer such as ethylene glycol dimethacrylate, allyl methacrylate, 1,3-butanediol dimethacrylate, diethylene glycol dimethacrylate, trimethylolpropane trimethacrylate, or divinylbenzene, in a proportion of 0.1% to 10%, preferably 0.1% to about 3% by weight, based on the first stage weight.

Water insoluble copolymers of nonionic monoethylenically unsaturated monomers with 1% or more of monoethyleneically unsaturated monomers containing a strong anionic functional group such as a sulfur oxy acid or a phosphorous oxy acid can also be used as the central core polymer. Examples of monomers containing such strong functional groups are: sodium allyl sulfonate sodium methallyl sulfonate, sodium styrene sulfonate, sodium vinyl sulfonate, sodium sulfoethyl methacrylate, phosphoethyl methacrylate, bis(methacryloxyethyl) phosphate, and also acrylate analogs of the methacrylates.

FORMATION AND COMPOSITION OF LOBES

The compositions of the core and lobe polymers must be different and relatively incompatible. It is preferred that the compositions vary to the extent that the interaction parameter, $X_{C-L}$, be greater than about 0.05. (The X stands for chi.) The interaction parameter can be calculated for the lobe and core polymers by the method of Krause et al., J. Chem. Physics, 43, 2144 (1965). Appropriate values of the Hildebrand solubility values necessary for the calculation may be found in Van Krevelen, "Properties of Polymers," Elsevier Publishers (New York), 1976.

One or more monomers selected from the following are preferred for the lobe monomer system: butyl acrylate (BA), methyl methacrylate (MMA), ethyl acrylate (EA), 2-ethyl hexyl acrylate (2-EHA), styrene (S), vinyl acetate (VA), acrylic acid (AA), methacrylic acid (MAA), isobornyl methacrylate (IBMA), ethylene (E), vinyl chloride (VCL), acrylonitrile (AN), isobutyl acrylate (IBA), butadiene (Bd), p-methyl styrene (PMS), vinyl toluene (VT), and the like.

A central core to lobe weight ratio of about ½ to 1/500 is preferred. The core glass transition temperature, Tg, is preferably above about 5° C., more preferably above about 100° C.

Preparation of multilobal dispersions with large lobe fractions (>25) and at high solids level under the conditions of this invention occurs readily with, for example, copolymers of butyl acrylate and methyl methacrylate with methyl methacrylate levels of about 60% or less (Tg of about 32° C. or less) or with copolymers of most of the other monomers listed of comparable Tg.

In some cases lobe monomer systems, e.g., BA/St, do not form lobes directly, but must be preceded by a composition which forms lobes readily. Examples are given in Table 2.

With some compositions, as with 10 BA/90 MMA as second stage, lobes are seen early in the monomer feed (10%) but disappear at the 25% feedpoint.

Preparation of a multilobal with polystyrene lobes does not occur readily with small particle size (0.1 to 0.2 micron diameter) cores, but can be carried out readily with a 1 micron first stage of the same composition (Example 8). The preferred weight ratio of lobe polymer to core ranges from greater than 1/1 to about 200/1. Lobes are frequently observed forming in at 10% to 25% into the polymerization process. Our efforts have been to prepare materials at high solids and maintain the lobe structure throughout the process.

A list of polymer compositions which may be useful in the multilobal context and projected uses is given in Table 3.

TABLE 1

Lobe Composition

| Lobe Composition | Multilobal Content or Multiplicity |
|---|---|
| 51.9 BA/46.8 MMA/1.3 AA | 90% 4X, 10% 3X |
| 46 BA/52.7 MMA/1.3 AA | >85% multilobal |
| 59.6 BA/39.1 MMA/1.3 AA | >85% multilobal |
| 70 BA/28.7 MMA/12.3 AA | 90% 2X |
| 80 BA/18 MMA/2 MAA | 90% 2X |
| 49 EA/49 2-EHA/2 AA | 80% multilobal |
| 49 EA/29 BA/22 2-EHA/2 AA | 50% multilobal |
| 73 EA/25 2-EHA/2 AA | 80% multilobal |
| 39 EA/66 2-EHA/1 MAA | 90% multilobal |
| 50 BA/48.7 S/1.3 AA | Some 2X and 4X |
| 95 BA/3.7 MMA/1.3 AA | Most 3X |
| 10 VA + 90 (60 BA/36.7 MMA/1.3 AA) | Several |

TABLE 2

Two Stage Lobe Compositions

| Lobe Composition | Multilobal Content or Multiplicity |
|---|---|
| 1. 20% (51.9 BA/46.8 MMA/1.3 AA) + 80% (50 BA/48.75 S/1.3 AA) | 70% multilobal |
| 2. 20% (52 BA/46.7 MMA/1.3 AA) + 80% (98 IBMA/2 AA) | 90% 3X |
| 3. 20% (51.9 BA/46.8 MMA/1.3 AA) + 80% (polystyrene) | 3X–4X |

TABLE 3

Multilobal Compositions and Projected Uses

| Polymer Type | Polymers or Copolymers of | Potential Use |
|---|---|---|
| Soft | Butyl acrylate, isobutyl acrylate 2-ethylhexyl acrylate, ethyl acrylate. | Adhesives Caulks Roof Mastics |
| Ambient Temperature Film Formers | Butyl acrylate, ethyl acrylate, methyl acrylate, isobutyl acrylate with methyl methacrylate, styrene, acrylonitrile, vinylacetate, vinyl chloride. Also copolymers of vinyl acetate with vinyl chloride, ethylene. | Vehicles for clear and/or pigmented coatings. |
| Hard, Thermoplastic Film Formers | Copolymers of methyl methacrylate butyl methacrylate, styrene, acrylonitrile; vinyl chloride with butyl acrylate or other plasticizing monomers. | Coatings which are baked. |
| Crosslinkable Film Formers | Copolymers of the above compositions which in addition contain one or more functional groups which react upon heating or catalysis or irradiation to crosslink the polymer. | Curable coatings. |
| Hard and/or Crosslinked | Polymers or copolymers of monomers with a single unsaturated group and also monomers with multiple unsaturation as divinyl benzene butadiene and butanediol dimethacrylate. | Rubbers — fillers spacers, extenders. |

PARTICLE SIZE RANGES

The central core is preferably about 0.05 to 1.5 microns, preferably about 0.5 to 1.0 microns. The final diameter of the multilobal particles is best determined by the diameter a sphere of equivalent volume would have.

The useful particle size range is given below assuming core/final volume ratios to range from 1/1 to 1/200, although ratios up to 1/500 are useful.

| Diameter, microns | Diameter Final, microns | |
|---|---|---|
| Core | 1/1 | 1/200 |
| .07 | .088 | 0.41 |
| 1.0 | 1.26 | 5.86 |

With a larger particle size we generally use a smaller growout volume increase of 50×, thus for a 2.0 micron core we obtain a final spherical equivalent particle diameter of 7.4 microns. If the core is swellable upon neutralization, a substantial further increase in particle volume and diameter is obtained.

MULTILOBAL POLYMERIZATION PROCEDURE

A two stage gradual addition polymerization is preferred. The core is preferably formed first, and may be formed on a seed or preform used to control particle nucleation (thus number and size) which may be of different composition.

The core may be formed in situ, as a first stage in the process, or it may be made separately and added.

The polymers are preferably made by aqueous emulsion polymerization. Less preferred methods to prepare core polymer are by nonaqueous dispersion or precipitation polymerization or by conversion of an organic solvent solution polymer to an aqueous dispersion.

The lobes may be formed by starting gradual addition feed of the appropriate lobe-forming monomer system in the presence of sufficient surfactant and then continuing the feed either at the same but often at an increased rate of addition to completion. We have found it in some cases advantageous to add an initial small increment of monomer or monomer emulsion to the kettle charge and this has been substituted for in other cases by a small increment of nonpolymerizable organic solvent such as Texanol.

Any free radical initiator useful in emulsion polymerization may be suitable for multilobal formation. We prefer the use of redox initiator systems of a persulfate oxidizing agent along with a bisulfite or sulfoxylate formaldehyde reducing agent. We especially prefer the use of an initial increment of the redox couple or of a reducing agent alone prior to introducing lobe-forming monomer system, followed by gradual addition of the redox couple simultaneously with the monomer feed as polymerization proceeds. An addition of a small amount of transition metal salt as ferrous sulfate hepta hydrate is often beneficial. This initiation procedure is unusual and, in combination with the surfactant procedure, distinguishes many embodiments of this invention from prior processes. Some embodiments do not require this initiation procedure.

Examples of initiators are based on thermal decomposition of sodium and ammonium persulfate and on redox reaction of these persulfates and t-butyl hydroperoxide with sodium sulfoxylate formaldehyde and sodium bisulfite as reducing agents. Also suitable are benzoyl peroxide and 4,4'-azo bis(4 cyanovaleric acid) as sources of free radicals.

Polymerization temperatures of about 15° C. to 125° C. are suitable, preferably 60° C. to 85° C., and more preferably 75° C. to 85° C.

SURFACTANTS AND SURFACTANT CONCENTRATION

Anionic surfactants such as ammonium salt of sulfated nonylphenoxy poly(ethyleneoxy) ethanol (Alipal® CO-436), sodium dodecylbenzene sulfonate (Siponate DS-4®), and sodium dodecyl diphenyloxide disulfonate (Dowfax 2A-1®) are the most preferred.

Most other anionic surfactants which are useful in emulsion polymerization should be suitable for multilobal preparations. Nonionic surfactants in combination with anionics are also effective.

The preferred surfactant level is about 0.1% to 5% by weight on total monomer. For certain systems, about 0.4 to 0.7% is optimal. The use of sufficient surfactant to maintain the lobe structure during the process, preferably continually added during the addition of the lobe-forming monomer sytem, is most preferred.

In conventional multiple stage emulsion polymerization processes where it is desired to avoid initiation of additional particles with second stage addition, the skilled artisan minimizes the level of surfactant at the point of second stage monomer feed. Contrary to conventional practice, we increase the level of surfactant added with lobe-forming monomer to just below the level at which new particles are initiated. This increased level of surfactant, in combination with the initiation procedure and monomer compositions, causes lobe formation on the central core. Sufficient surfactant is added with the entire lobe-forming monomer feed to maintain the lobes until completion of the process.

Higher levels of surfactant are desirable for smaller particle size lobe initiation and maintenance. Polymerizable surfactants appear to be very effective in stabilizing lobe formation. Strong acid group containing monomers are effective in lobe stabilization and to replace conventional surfactant.

The following examples are presented to illustrate a few different embodiments of the invention, but the invention should not be considered as limited thereto.

EXAMPLES

Example 1

Multilobal Paint Vehicles

A. Core Polymer

Reactor: 5 liter glass flask with stirrer, thermometer, nitrogen inlet, reflux condenser and heating mantle.

The reactor is charged with 2400 gm deionized water and 1.39 gm of the ammonium salt of sulfated nonylphenoxy poly(ethyleneoxy) ethanol (4 ethylene oxide) (Alipal® CO-436 brand) and heated to 85° C. while being flushed with nitrogen. An initial charge of monomer emulsion consisting of 34 gm deionized water, 0.32 Alipal CO-436, 52 g butyl acrylate, 46.6 g methyl methacrylate and 1.4 g methacrylic acid is added to the kettle followed by 5 g sodium persulfate dissolved in 50 g deionized water. This initial charge is allowed to react for fifteen minutes. Following this, a monomer emulsion consisting of 406 gm deionized water, 7.6 gm Alipal CO-436, 55 gm butyl acrylate, 604.9 gm methyl methacrylate, 440 gm methacrylic acid and 5.5 gm 1,3-butanediol dimethacrylate is added over a period of three hours at 85° C. After completion of monomer feed the charge is held at 85° C. for one-half hour and then cooled to room temperature. It is then filtered to remove coagulum. The final dispersion is 30.0% solids, has a pH of 2-3 and an average particle diameter of 150 nanometers as determined by Nanosizer TM particle size analyzer (Coulter Electronics Ltd.).

B. Lobes

To a reactor like the one used in part A of this example is charged 600 g deionized water and the kettle charge is heated to 80° C. while being flushed with nitrogen. When the temperature has leveled off at 80° C. an initial catalyst system consisting of 1.5 gm 1% FeSO$_4$.7 H$_2$O solution, 10.5 gm of 4.2% sodium persulfate solution and 10.5 g of 4.2% sodium formaldehyde sulfoxylate solution in water is added. Almost immediately following, 118.3 gm of the core dispersion from part A is added. Following this, a monomer emulsion consisting of 351 gm. deionized water, 29.0 gm Alipal CO-436, 896.5 gm butyl acrylate, 878.5 gm methyl methacrylate and 17.9 gm acrylic acid is added over a 2 hour 25 minute period. Concurrently, solutions of 4.1 gm sodium persulfate and 1.7 gm t-butyl hydroperoxide in 165 gm deionized water and 3.4 gm sodium bisulfite in 165 gm deionized water are fed to the kettle. The temperature is maintained at 80° C. After completion of the feeds the product is cooled to room temperature. 0.82 Gm t-butyl hydroperoxide in 7 gm deionized water and 0.4 gm sodium hydrosulfite in 12 gm deionized water are added during the cooling period. The product is at 56% solids and pH 2.0. The particle diameter, calculated for a spherical dispersion product, should be 0.56 microns. Upon optical microscope examination, the actual particles of this product (especially after neutralization with NH$_4$OH to pH 9.0) appear not to be spherical but to have two or more lobes per particle and are thus "multilobal." The multilobal is larger in appearance than a spherical particle dispersion of 0.56 micron diameter.

C. Paint

The product of part B of this example is made into a paint (40 pigment volume concentration and 40% volume solids) and compared in the formulation shown below to a typical commercial high film build acrylic exterior paint vehicle. The product of part B (3 parts) was blended with one part of the small particle size conventional, spherical particles produced in Example 11, infra, and compared in the same paint formulation.

TABLE 4

| Polymer Dispersion | 24 hr. Equilibrated Paint Properties | | |
|---|---|---|---|
| | pH | ICI[1] | Build[2] |
| Comparative | 9.2 | 1.30 | 13.3 |
| Invention (blend) | 8.9 | 1.45 | 14.2 |
| Invention (multilobal alone) | — | 1.65 | — |

[1]Viscosity at high shear (10,000 reciprocal seconds) in poise as measured by a cone and plate viscometer developed by Imperial Chemical Industries.
[2]Film build in grams wet paint per square foot.

TABLE 5

| Grind | lbs. |
|---|---|
| Water | 94.8 |
| Pigment Dispersant (25% in H$_2$O) | 14.6 |
| Wetting Aid (alkaryl polyether) | 2.5 |
| Defoamer | 1.5 |
| Ethylene Glycol | 25.1 |
| TiO$_2$, Rutile | 243.8 |
| Talc | 198.8 |

The above materials are ground on a Cowles Dissolver at 3800–4500 rpm for 20 minutes and let down at a slower speed as follows:

TABLE 6

| | |
|---|---|
| Latex (50% solids) | 448.6 |
| Defoamer | 1.0 |
| Preservative | 1.0 |
| Coalescent[1] | 11.2 |
| Propylene Glycol | 34.1 |
| $H_2O$ | 11.2 |
| Hydroxyethyl Cellulose Solution (2.5% in $H_2O$) | 82.2 |
| | 1170.4 |

EXAMPLE 2

Multilobal Paint Vehicle

Preparation of Multilobal Particle

To a reactor like the one used in part A of Example 1 is charged 500 g deionized water and the kettle charge is heated to 80° C. while being flushed with nitrogen. When the temperature has leveled off at 80° C. an initial catalyst system consisting of 1.5 g 1% $FeSO_4.7 H_2O$ solution, 10.5 g of 4.2% sodium persulfate solution and 10.5 g of 4.2% sodium formaldehyde sulfoxylate solution in water is added. Almost immediately following, 88.7 g of the core dispersion from part A of Example 1 is added. A monomer emulsion consisting of 300 g deionized water, 50 g Alipal CO-436, 896.5 g butyl acrylate, 878.5 g methyl methacrylate and 17.9 g acrylic acid is added over a 2 hour 35 minute period. Concurrently, a solution of 4.1 g sodium persulfate and 1.7 g t-butyl hydroperoxide in 165 g deionized water and 3.4 g sodium bisulfite in 165 g deionized water are fed to the kettle. The temperature is maintained at 80° C. After completion of the feeds the product is cooled to room temperature. A portion of the cofeed catalyst solution is added during the cooling stage to complete polymerization. The product is at 58.8% solids and pH 2.1. The calculated particle size of the product dispersion is 0.61 micron. By optical microscopic examination the particles of this dispersion appear as larger than expected for a 0.61 micron spherical dispersion and larger than the particles of Example 1, each particle being made up of two or more lobes with most of the particles having three lobes. When this product is made into a paint as in part C of Example 1 and compared to the standard paint vehicle, the paint with the vehicle of the invention gave an ICI of 3.7 compared to an ICI of 1.2 for the standard control.

EXAMPLE 3

Acid Content in Core Polymer a. Preparation of Core of Hydrophilic Functional Copolymers on a Low Polarity Preform Reactors: four 5 liter glass flasks with stirrer, thermometer, nitrogen inlet, reflux condenser and heating mantle.

The reactors are charged with 2080 gm deionized water and 3.2 gm Siponate DS-4 and heated to 82° C. while being flushed with nitrogen. An initial monomer charge of 6.9 gm butyl acrylate, 75.5 gm methyl methacrylate and 0.9 gm methacrylic acid is added to each reactor. This is followed immediately with 5.5 gm sodium persulfate in 30 gm water.

Monomer emulsions as described below are prepared for four copolymer compositions.

TABLE 7

| Sample | 3A-1 | 3A-2 | 3A-3 | 3A-4 |
|---|---|---|---|---|
| MAA Level | 10% | 20% | 30% | 40% |

TABLE 8

| Monomer Emulsion, grams | | | | |
|---|---|---|---|---|
| Deionized $H_2O$ | 406 | 406 | 406 | 406 |
| Siponate DS-4 | 16 | 16 | 16 | 16 |
| Butyl Acrylate | 55.6 | 55.6 | 55.6 | 55.6 |
| Methyl Methacrylate | 944.4 | 834.2 | 722.9 | 611.7 |
| Methacrylic Acid | 112.2 | 222.4 | 333.4 | 444.9 |
| Butanediol Dimethacrylate | 33.3 | 33.3 | 33.3 | 33.3 |

When the initial charge has reacted (about 10 minutes) feed of the second monomer emulsion is started at about 6 gm/minute. The temperature is maintained at 82° C. Thirty minutes into the reaction the feed rate is increased to about 14 gm/minute. When the monomer feed is completed the reaction is allowed to cool to room temperature.

The solids level is 32.1% and the particle diameters are about 0.18 micron by Nanosizer.

b. Preparation of Lobes to Show Effect Copolymer Acid Content

Reactors: 5 liter glass flasks with stirrer, thermometer, nitrogen inlet, reflux condenser and heating mantle.

Four emulsion polymerization preparations of second stage polymer on the cores generated in 3A-1, -2, -3 and -4 are carried out in the following manner. A monomer emulsion consisting of the following is prepared for each.

TABLE 9

| | |
|---|---|
| Deionized water | 600 gm. |
| Alipal CO-436 | 15 gm. |
| Butyl Acrylate | 915 gm. |
| Methyl Methacrylate | 826 gm. |
| Acrylic Acid | 23.2 gm. |

The reactors are charged with 500 gm deionized water and 44 gm each of the core dispersions 3A to 3D. After flushing the reactor with nitrogen and with the reactor charge at 85° C. the following initial initiator solutions are added to each of the reactors.

TABLE 10

| | |
|---|---|
| Sodium Persulfate | 0.5 gm in 10 gm $H_2O$ |
| Sodium Sulfoxylate Formaldehyde | 0.5 gm in 10 gm $H_2O$ |
| $FeSO_4.7 H_2O$ solution (0.1%) | 15 gm |

Cofeed initiator solutions have also been prepared for each.

TABLE 11

| | |
|---|---|
| Sodium Persulfate | 4.1 gm in 54 gm $H_2O$ |
| Sodium Bisulfite | 3.4 gm in 54 gm $H_2O$ |

Shortly after addition of the initial initiator solution slow feed of the monomer emulsion is begun. Feed of the cofeed catalyst solutions is also begun and programmed to continue during feed of the monomer emulsion. The temperature is maintained at 85° C. After 20 minutes the feed rate of the monomer emulsion is increased so as to complete feed in 165 minutes. After completion the dispersions are slowly cooled. The solids level of all the samples 3B-1 to 3B-4 is 58%.

Samples of the dispersions 3B-1 to 3B-4 are diluted to about 1% concentration with water and examined with an optical microscope using a visual magnification of 1000×. The following particle shapes are observed.

TABLE 12

| Sample | Seed Acid Level | Particle Shape |
|---|---|---|
| 3B-1 | 10% | Sphere |
| 3B-2 | 20% | Most spheres 10% doublets |
| 3B-3 | 30% | Mostly triplets and quadruplets |
| 3B-4 | 40% | Mostly triplets and quadruplets |

The diameter of the spherical particles is about 0.88 micron. The diameter of each of the lobes of a triplet is about 0.61 micron.

EXAMPLE 4

Multilobal Particle Dispersion and Blend a. Reactor: five liter glass flask equipped for emulsion polymerization.

A monomer emulsion consisting of the following is preapred.

| | |
|---|---|
| Deionized Water | 545 gm |
| Alipal CO-436 | 14.9 gm |
| Butyl Acrylate | 914 gm |
| Methyl Methacrylate | 826 gm |
| Acrylic Acid | 23.4 gm |

The reactor is charged with 600 gm deionized water and heated to 85° C. under a nitrogen atomosphere. An initial initiator charge of 20 ml 0.1% FeSO$_4$.7 H$_2$O and 1 gm sodium sulfoxylate formaldehyde is added followed two minutes later by 46.6 gm core dispersion from part A-4 of Example 3 rinsed in with 10 ml water, followed by addition of cofeed initiator solutions, 5 gm ammonium persulfate in 62 gm water and 3.4 gm sodium bisulfite in 62 gm water. Initiator addition rate is adjusted so as to complete addition in about 4 hours. Within 10 minutes feed of the monomer emulsion at 5 gm/minute is begun. Thirty minutes after start of monomer emulsion feed an additional 7.5 gm Alipal CO-436 is added to the monomer emulsion and mixed well. In thirty more minutes monomer emulsion feed rate is increased to 15 gm/minute. The reaction temperature is maintained at 80°-82° C. When the monomer emulsion feed is completed, the initiator solution is continued until finished. Temperature is held 22 minutes and then allowed to cool. The solids level of the dispersion is 55.7%. The particle size determined by nanosizer is 750 nanometers and the particles were observed to be multilobals with most having 3, 4 or 5 lobes.

The above dispersion and most of the other multilobal products of the various examples are relatively low viscosity at low pH as prepared. This dispersion viscosity is 50 cps. Under this condition sediment formation will be rapid. However, if this dispersion is neutralized to pH levels above 8.5 the viscosity, especially the high shear viscosity, would increase excessively.

To provide pourable dispersions at high pH and to reduce the tendency to sedimentation the multilobal is mixed, i.e., blended, with an equal amount, on a solids basis, of all acrylic, emulsion-produced, 60% solids, all spherical particle dispersion which had already been neutralized to a pH of 9.2 ("Standard Dispersion"). The resultant 57.3% solids mixture had a pH of 6.3 and a viscosity of 840 cps. This was adjusted with NH$_4$OH to a pH of 9.0 and the viscosity increased to 1340 cps. Blending multilobal dispersion gave a dispersion blend which exhibits markedly improved film build in paints over the standard spherical dispersion alone.

b. Comparison in Paints

Paints were prepared of the product of this example and compared with paints made with a control vehicle and with the standard dispersion. These were in a 40 PVC, 38% VS formulation.

TABLE 13

| Material | Paint ICI | Paint Film Build |
|---|---|---|
| Control Vehicle | 1.35 | 9.9 |
| Standard Dispersion | 0.80 | 8.3 |
| Multilobal of this Example | 3.00 | 16.5 |
| Blend 1 Part Multilobal of this Example with 1 Part Standard Dispersion | 1.53 | 10.6 |

The control vehicle is an acrylic exterior paint vehicle which has good film build.

TABLE 14

| Formulation, Flat Paint, 40 PVC, 38% VS. | |
|---|---|
| Grind | Lbs. |
| Material | |
| Hydroxyethyl Cellulose, 2.5% solution in Water | 75.0 |
| Pigment Dispersant (25% Solids) | 11.3 |
| Water | 60.0 |
| Defoamer | 1.0 |
| Wetting Aid, Alkylaryl Polyether | 2.4 |
| Ethylen Glycol | 23.2 |
| Titanium Dioxide, Rutile | 234.4 |
| Aluminum Silicate | 171.6 |
| Silicate | 5.0 |
| Letdown | |
| Polymer dispersion, as 52.5% Solids | 405.9 |
| Water | 15.0 |
| Preservative | 9.0 |
| Defoamer | 1.0 |
| Coalescent | 10.6 |
| Propylene Glycol | 32.4 |
| Hydroxyethyl Cellulose, 2.5% Solution in Water | 87.1 |

EXAMPLE 5

Multilobals with Different Core Polymers

A. Preparation of Core Dispersions of Hydrophilic Functional Copolymers

The equipment and procedure of Example 3A is used to prepare core dispersions on 6.7% of a low polarity preform of the following compositions:

TABLE 15

1. 5 BA/55 MMA/40 HEMA + 3% butanediol dimethacrylate
2. 5 BA/75 MMA/20 HEMA + 1% butanediol dimethacrylate
3. 5 BA/55 MMA/20 MAA/20 HEMA + 1% butanediol dimethacrylate
4. 5 BA/65 MMA/20 MAA/10 AM + 3% butanediol dimethacrylate
5. 5 BA/65 MMA/30 AA + 3% butanediol dimethacrylate Compositions of the appropriate monomer emulsion are as follows, weights are in grams.

TABLE 16

| | 1 | 2 | 3 | 4 | 5 |
|---|---|---|---|---|---|
| Deionized Water | 406 | 406 | 406 | 406 | 406 |
| Siponate DS-4 | 16 | 16 | 16 | 16 | 16 |
| Butyl Acrylate (BA) | 55.6 | 55.6 | 55.6 | 55.6 | 55.6 |
| Methyl Methacrylate (MMA) | 611.2 | 833.4 | 611.2 | 722.3 | 722.3 |

TABLE 16-continued

|  | 1 | 2 | 3 | 4 | 5 |
|---|---|---|---|---|---|
| Hydroxyethyl Methacrylate (HEMA) | 444.5 | 222.2 | 222.4 | — | — |
| Acrylamide (AM) | — | — | — | 111.1 | — |
| Acrylic Acid (AA) | — | — | — | — | 333.4 |
| Methacrylic Acid (MMA) | — | — | 222.4 | 222.4 | — |
| Butanediol Dimethacrylate | 33.3 | 11.1 | 11.1 | 33.3 | 33.3 |

The solids levels of the five dispersions thus prepared are all about 32.1% and the particle diameters are about 0.18 micron by Nanosizer.

B. Preparation of Second Stage Particles with Core Dispersions 5A-1 Through 5A-5

The same procedures and compositions used in 4B were carried out with 5A-1 through -5 as cores. The following results were obtained.

TABLE 17

| Core | Particle Description |
|---|---|
| 5A-1 | 85% triplets and quadruplets |
| 5A-2 | most spheres |
| 5A-3 | 85% multilobes |
| 5A-4 | 95% multilobes |
| 5A-5 | 10% triplets, 40% doublets |

TABLE 18

| Comparison in Paints | I.C.I. | Build |
|---|---|---|
| 1. Control Vehicle (50% Solids) | 1.25 | 10.0 |
| 2. Standard Dispersion (59% Solids) | 0.8 | 8.3 |
| 3. Blend 1 Part Multilobal EX 5B Using 5A-1 1st Stage (55% Solids) With 1 Part Standard Dispersion | 1.0 | 9.1 |
| 4. Blend 1 Part Multilobal EX 5B Using 5A-3 1st Stage With 1 Part Standard Dispersion | 1.2 | 10.5 |

The paint formulations, control vehicle and standard dispersion are described in Example 4.

EXAMPLE 6

Multilobal with Polyvinyl Acetate Seed a. Preparation of Seed Polymer Dispersion A two liter flask equipped with a stirrer, thermometer, reflux condenser and means for temperature control and nitrogen atmosphere is used. An initial charge of 397 gm deionized water and 0.24 gm sodium dodecylbenzene sulfonate is heated to a temperature of 78° C. under a nitrogen atmosphere with stirring. A monomer emulsion is prepared from 196 gm deionized water, 0.22 gm sodium dodecyl benzene sulfonate, 208 gm butyl acrylate, 186.8 gm methylmethacrylate and 5.21 gm methacrylic acid. 20.8 Gm of this monomer is added to the initial charge and then followed by 1.7 gm sodium persulfate dissolved in 10 gm water. Fifteen minutes later, a gradual feed of the monomer emulsionis begun and continued so as to be completed in 1½ hours. The temperature is allowed to rise to 85° C. and maintained there. Fifteen minutes after monomer addition is complete the reaction mixture is cooled. 0.5 Gm aqua ammonia is added to improve stability. The product is 40% solids and has a particle size of 0.15 micron by Nanosizer.

b. Reactor: 2 liter glass flask with stirrer, thermometer, nitrogen inlet and reflux condenser.

The reactor is charged with 248 gm deionized water and heated to 70° C. while sweeping nitrogen through the flask. When the reactor temperature levels off at 70° C. the following are charged:

TABLE 19

| 0.4 ml 1% FeSO$_4$.7H$_2$O solution |
| 0.12 gm ammonium persulfate |
| 0.12 gm sodium sulfoxylate formaldehyde |
| 14.7 gm of a 40% solids seed polymer dispersion as prepared in 5A |
| 0.47 gm glacial acetic acid |

Approximately 11 gm water is used to rinse in the above where needed.

As soon as possible a feed of monomer emulsion A as described below is begun.

TABLE 20

| Monomer Emulsion A | |
|---|---|
| Deionized Water | 26 gm |
| Triethanolamine salt of dodecylbenzene sulfonic acid, 60% active | 0.65 gm |
| Octylphenoxy polyethylene oxy ethanol (70%) | 0.75 gm |
| Sodium Acetate | 0.09 gm |
| Vinyl Acetate | 98.1 gm |

Simultaneously, feeds of free radical initiating solutions, 1.12 gm ammonium persulfate nd 0.47 gm t-butyl hydroperoxide in 45 gm water and 0.94 gm sodium bisulfite in 46 gm water is begun and continued throughout the reaction. Feed monomer emulsion A over a period of thirty minutes while maintaining the temperature at 70° C. When A is completed, then feed monomer emulsion B over a period of 2½ hours with the temperature at 75° C.

TABLE 21

| Monomer Emulsion B | |
|---|---|
| Deionized Water | 102 gm |
| Triethanolamine salt of dodecylbenzene sulfonic acid, 60% active | 2.6 gm |
| Octylphenoxy polyethylene oxy ethanol (70%) | 3.0 gm |
| Sodium Acetate | 0.38 gm |
| Vinyl Acetate | 98.1 gm |
| Butyl Acrylate | 157 gm |
| Methyl Methacrylte | 137.4 gm |

Adjust feed of the free radical initiators so that they continue for 20 minutes after monomer feed is completed. Upon completion of polymerization allow the product to cool to 50° C. and add the following:

0.22 gm t-butylhydroperoxide in 2 gm H$_2$O followed by 0.11 gm Lykopon in 4 gm H$_2$O. Cool another hour and add a neutralizer of 1.12 gm aqua ammonia.

The solids is 49.1%, the particle diameter is about 0.55 micron and the particles are multilobal.

EXAMPLE 7

Acrylic Multilobal with Polyvinyl Acetate Seed a. Preparation of an Acrylic Multilobal on a Polyvinyl Acetate Central Core Monomer emulsions 1 and 2 are prepared as follows:

|  | M.E. 1 | M.E. 2 |
|---|---|---|
| Deionized H$_2$O | 45 gm | 304.5 gm |
| Triethanolamine | 1.2 gm | 10.75 gm |

-continued

| | M.E. 1 | M.E. 2 |
|---|---|---|
| salt of dodecylbenzene sulfonic acid, 60% active | | |
| Octylphenoxy polyethylene oxy ethanol (70%) | 1.38 gm | 12.44 gm |
| Sodium Acetate | 0.17 gm | 1.55 gm |
| Vinyl Acetate | 179.3 gm | — |
| Butyl Acrylate | — | 839.1 gm |
| Methyl Methacrylate | — | 753.6 gm |
| Acrylic Acid | — | 21.0 gm |

Catalyst solution is 1.72 gm t-butyl hydroperoxide + 4.09 gm ammonium persulfate in 166 gm deionized water and 3.43 gm sodium bisulfite in 168 gm deionized water.

In a five liter glass flask equipped for emulsion polymerization a charge of 895 gm deionized water and 53.8 gm of seed polymer dispersion from Example 6A is heated to 72° C. while stirring under a nitrogen atmosphere. 15 gm of a 0.1% $FeSO_4.7\ H_2O$ aqueous solution, 0.44 gm ammonium persulfate in 10 gm water, 0.44 gm sodium sulfoxylate formaldehyde in 10 gm water and 1.72 gm acetic acid in 10 gm water are added. Three minutes after, addition of monomer emulsion 1 is started at a rate such that it will be completed in 20 minutes. Addition of the catalysts is carried out concurrently. The temperature is maintained at 70°-75° C. Upon completion of monomer emulsion 1 addition of monomer emulsion 2 is started and continued such that it will be completed in two hours and twenty minutes. Addition of the catalyst is continued. When addition of the monomer emulsion is completed addition of the cofeed catalyst 2 is continued til they are completed—about ten minutes more. The product is allowed to cool to 35° C. at which time it is neutralized with aqua ammonia. The solids level was 51.4%. Microscope observation showed the particles to be assymetric with a multilobal structure.

EXAMPLE 8 a. Preparation of 1 Micron Core Polymer Dispersion

Reactor: five liter glass flask with stirrer, thermometer, nitrogen inlet, reflux condenser and heating mantle.

The reactor is charged with 2400 gm deionized water and heated to 85° C. while being flushed with nitrogen. An initial charge of monomer emulsion consisting of 12 gm deionized water, 0.058 gm nonylphenoxy (ethyleneoxy), ethanol sulfate, ammonium salt, 5.2 gm butyl acrylate, 46.4 gm methyl methacrylate and 1.4 gm methacrylic acid is added to the kettle followed by 5 gm sodium persulfate dissolved in 50 gm deionized water. This initial charge is allowed to react for fifteen minutes and then a monomer emulsion consisting of 330 gm deionized water, 1.1 gm nonylphenoxy (ethyleneoxy)$_3$ ethanol sulfate, ammonium salt, 55 gm butyl acrylate, 605 gm methyl methacrylate and 440 gm methacrylic acid is added over a period of three hours with the temperature maintained at 83° C. After completion, the charge is held at 83° C. for one half hour and then cooled to room temperature. It is filtered to remove any coagulum. The final dispersion is 31.8% solids, has a pH of about 2 and a particle diameter of 0.45 micron.

In similar equipment and under similar initial conditions 157 gm of the above product is added to a kettle charge of 2400 gm deionized water containing 2.5 gm sodium persulfate at 83° C. To this charge is gradually added a solution of 27.5 gm butyl acrylate, 302.5 gm methyl methacrylate and 220 gm methacrylic acid over a two hour period while keeping the temperature at 83° C. Upon completion of feed the reaction charge is stirred at 83° C. for a half hour and then cooled and filtered. The total solids is 18.4% and the particle size is about 1.0 micron, relatively monodisperse with only a few particles of a second small mode.

b. Preparation of Large Particle Size Polystyrene Multilobal

Reactor: 2 liter glass flask with stirrer, thermometer, nitrogen inlet, reflux condenser and heating mantle.

The flask is charged with 500 gm deionized ater an heated to 85° C. while stirring under a nitrogen atmosphere. After levelling at 85° C. 124 gm of the core dispersion from part A of this example is added. A monomer emulsion as follows has previously been prepared.

TABLE 22

| Deionized Water | 100 gm |
|---|---|
| Alipal EP-110 | 2.0 gm |
| Styrene | 297 gm |
| Allylmethacrylate | 3.0 gm |
| Benzoyl Peroxide | 3.0 gm |

The monomer emulsion is fed slowly over a five hour period with the temperature maintained at 85° C. When the reaction is completed the solids level is found to be 21.3%. The particles are of about 2 micron diameter and have four to six or more lobes. When the dispersion is neutralized (after further dilution) and examied under a microscope, the particles are seen to be much enlarged with the lobes extended.

A portion of the above dispersion is further grown out as follows.

Using the same equipment, charge 500 gm deionized water and 281.7 gm of the above disperision and heat to 85° C. A monomer emulsion is prepared as follows:

TABLE 23

| Deionized Water | 110 gm |
|---|---|
| Alipal EP-110 | 1.6 gm |
| Styrene | 240 gm |
| Benzoyl Peroxide | 2.4 gm |

With the water-core dispersion at 85° C. under a nitrogen atmosphere the monomer emulsion is slowly fed over a two and one half hour period while maintaining slow agitation. At the end of this time about ¾ of the monomer emulsion has been fed. Examination of a sample showed that the starting material has increased in size with growth of the lobes and very few new particles have formed with almost all of the growth occurring on the starting material. Monomer emulsion feed is continued for another hour to completion. The particles have further increased in size but some of the lobes have fused so that most of the particles have only two or three lobes. Solids of the final sample is 24.5%.

EXAMPLE 9

Multilobal with an Acrylate Core a. Preparation of Core with Acrylic Acid

Reactor: five liter glass flask with stirrer, thermometer, nitrogen, inlet, reflux condenser and heating mantle.

A monomer emulsion is prepared from the following ingredients.

TABLE 24

| Deionized Water | 242 gm |
|---|---|

TABLE 24-continued

| | |
|---|---|
| Alipal CO-436 | 10.0 gm |
| Butyl Acrylate | 58.1 gm |
| Methyl Acrylate | 984.7 gm |
| Acetic Acid | 0.8 gm |
| Sodium Vinyl Sulfonate (25%) | 11.6 gm |

Sixty three grams of the above emulsion is removed and set aside for use as an initial charge. Then 116.2 gm acrylic acid is added to the above monomer emulsion and rendered homogeneous.

A kettle charge of 2250 gm deionized water is heated to 80° C. while stirring under nitrogen. The initial charge monomer emulsion (63 gm) is added to the kettle followed shortly by 0.6 gm acetic acid, 40 ml of 0.1% $FeSO_4.7 H_2O$ solution, 0.2 gm ammonium persulfate in 10 gm water. Ten minutes later slow feed of the monomer emulsion is begun and simultaneously feeds of 1.2 gm ammonium persulfate and 1.7 gm t-butylhydroperoxide in 45 ml water and of 1.9 gm sodium bisulfite in 74 ml water are begun. The feed rates are adjusted so the monomer feed is completed in three hours and the cofeeds 15 minutes later. The dispersion is cooled and filtered. Sixteen gm wet gum is removed. Solids of the dispersion is 30%, pH is 2.5 and the particle diameter by Nanosizer is 154 nanometers.

b. Preparation of Multilobal with Acrylic Acid Functional Core

A two liter glass reactor suitable for emulsion polymerization is used. A monomer emulsion of the following is prepared.

TABLE 25

| | |
|---|---|
| Deionized Water | 140 gm |
| Alipal CO-436 | 5.0 gm |
| Butyl Acrylate | 278 gm |
| Methyl Methacrylate | 274.3 gm |
| Acrylic Acid | 7.52 gm |

The reactor is charged with 219.5 gm deionized water and heated to 85° C. under nitrogen. 1.63 gm ammonium persulfate in 4 gm water is added followed by 29.4 gm of the core dispersion prepared in part A of this example. Slow feed of the monomer emulsion is begun and the feed rate adjusted so as to be completed in 210 minutes. After approximately 17% of the monomer emulsion has been added an additional 5 gm Alipal CO-436 and a solution of 0.8 gm aqua ammonia is added to he monomer emulsion and agitated until homogeneous. The temperature is maintained at between 80° C. and 85° C. After completion of the feed the dispersion is allowed to cool slowly and while cooling an increment of 0.1 gm t-butyl hydroperoxide in 3 gm water followed by 0.06 gm sodium sulfoxylate formaldehyde in 3 gm water are added. The solids level was 59%. Microscope observation showed the product to be of multilobal morphology with lobes of about 0.55 micron.

c. Effect of Surfactant and Initiator Distribution on Multilobal Formation

The procedure of part B of this example is repeated with these changes.

1. Only 0.58 gm Alipal CO-436 is added to the initial monomer emulsion.

2. 9.4 gm Alipal CO-436 is added to the monomer emulsion after 17% has been fed.

3. Only 0.47 gm ammonium persulfate is added to the reactor initially.

4. A solution of 1.1 gm ammonium persulfate in 60 gm water is added concurrently with the monomer emulsion feed.

The solids level of this dispersion was 59.4%. Microscope examination showed that the dispersion was mainly single spherical appearing particles with perhaps a few doublets. Particle diameter by Nanosizer was 600 nanometers. Changing the surfactant and initiator distribution greatly reduced or eliminated multilobal formation.

EXAMPLE 10

Comparative

Using Low Surfactant Level

The procedure of Example 3A-4 is used to prepare core particles and Example 3B, except using only 3 gm Alipal CO-436 surfactant, is used to prepare the dispersions. Only 25% of the particles are doublets, with the balance being spherical.

EXAMPLE 11 a. Small Particle Emulsion Polymer

Reator: five liter glass flask with stirrer, thermometer, nitrogen inlet, reflux condenser and heating mantle.

The flask is charged with 1350 gm deionized water and heated to 82° C. while stirring under nitrogen. A monomer emulsion is prepared as follows:

TABLE 26

| | |
|---|---|
| Deionized Water | 650 gm |
| Alipal CO-436 | 3 gm |
| Butyl Acrylate | 704 gm |
| Methyl Methacrylate | 632 gm |
| Acrylic Acid | 17.6 gm |

With the reactor water temperature at 82° C., 241 gm Alipal CO-436, 4.2 gm sodium carbonate and 4.9 gm sodium persulfate are added to the reactor. With the reactor charge temperature at 82° feed of the monomer emulsion is begun at 3 gm/minute. Twenty minutes later the feed rate is increased to 6 gm/minute and again in twenty more minutes to 12 gm/minute. The temperature is maintained at 82° and the reaction is completed in 3 hours. The solids level is 41% and particle diameter is estimated to be 42 nanometers.

EXAMPLE 12

Multilobal for Adhesive a. Core Dispersion

The procedure of Example 1A but using the ingredients listed below is used to prepare a core polymer dispersion.

TABLE 27

| | |
|---|---|
| Kettle Charge | |
| Deionized Water | 2400 gm |
| Siponate DS-4 | 11.2 gm |
| Sodium Persulfate | 5.5 gm |
| Initial Charge Monomer Emulsion | |
| Deionized Water | 28 gm |
| Siponate DS-4 | 3.9 gm |
| Butyl Acrylate | 6.9 gm |
| Methyl Methacrylate | 75.5 gm |
| Methacrylic Acid | 0.9 gm |
| Feed Monomer Emulsion | |
| Deionized Water | 406 gm |
| Siponate DS-4 | 16 gm |
| Butyl Acrylate | 55.6 gm |
| Methyl Methacrylate | 611 gm |
| Methacrylic Acid | 444.6 gm |

TABLE 27-continued

| | |
|---|---|
| 1,3-Butylene dimethacrylate | 33.3 gm |

The resultant solids level was 30.4% and the particle size was 107 nanometers.

b. Multilobal Preparation

The procedure and materials of Example 5B with the following charges are used to make a multilobal emulsion polymer.

Changes:
1. The following monomer emulsion is used.

| | |
|---|---|
| Deionized Water | 600 gm |
| Alipal CO-436 | 46 gm |
| Butyl Acrylate | 1676.1 gm |
| Methyl Methacrylate | 65.3 gm |
| Acrylic Acid | 23.0 gm |

2. For the central core use 44 gm of the 107 nanometer dispersion from part A of this example.

The final solids level was 55.0% and the particles were seen to be mostly triplets. Particle diameter was estimated to be 0.54 micron equivalent sphere basis.

This multilobal, either as is or diluted and neutralized, is useful as an adhesive.

EXAMPLE 13 a. Multilobal with 80% Polystyrene Lobes

Reactor: A five liter glass flask equipped for emulsion polymerization. Two monomer emulsions consisting of the following are prepared.

TABLE 28

| | |
|---|---|
| Monomer Emulsion A | |
| Deionized Water | 120 gm |
| Alipal CO-436 | 4.4 gm |
| Butyl Acrylate | 183 gm |
| Methyl Methacrylate | 165.2 gm |
| Acrylic Acid | 4.6 gm |
| Monomer Emulsion B | |
| Deionized Water | 540 gm |
| Alipal CO-436 | 23.8 gm |
| Styrene | 1384 gm |

A charge of 100 gm dionized water is heated to 82° C. under a nitrogen atmosphere. An initial initiator charge of 20 gm 0.1% $FeSO_4.7\ H_2O$ solution and 1.0 gm sodium sulfoxylate formaldehyde in 10 gm water are added to the charge followed by 42.8 gm of the dispersion from Example 3A-4. Addition of two initiator solutions (3.3 gm ammonium persulfate in 42 gm water and 2.3 gm sodium bisulfite in 42 gm water) is begun. Ten minutes later, feed of monomer emulsion A is begun at 5 gm/minute. Thirty minutes later the feed rate is increased to 15 gm/minute. The temperature is maintained at 82° C. When monomer emulsion A has been added feed of monomer emulsion B is begun at 5 gm/minute. The initiator solutions used for A are discontinued and addition of another initiator solution, 4.8 gm ammonium persulfate in 84 ml deionized water is begun. Ten minutes later the monomer emulsion feed is increased to 15 gm/minute and the temperature is increased to 85° C. Addition of this monomer emulsion is continued for 2 hours and 10 minutes more and at this time it is completed. Addition of initiator is continued for 20 minutes more at 85° C. Following this it is allowed to cool slowly while stirring.

Solids level is 47.5%.
Particle diameter—about 0.88 micron.
Particle geometry—>95% four lobes.

EXAMPLE 14

0.50 Micron Multilobal

The following procedure of Example 3B but with the following materials is used to prepare a multilobal dispersion.

TABLE 29

| | |
|---|---|
| Monomer Emulsion | |
| Deionized Water | 523.6 gm |
| Alipal CO-436 | 15.1 gm |
| Acrylic Acid | 23.3 gm |
| Butyl Acrylate | 930 gm |
| Methyl Methacrylate | 829 gm |
| Kettle Water Charge | 572 gm |
| Initial Catalyst | |
| $FeSO_4.7\ H_2O$, 1% $H_2O$ Solution | 20 gm |
| Sodium Sulfoxylate Formaldehyde Solution (5%) | 20 gm |
| Cofeed Catalyst | |
| Ammonium Persulfate | 10 gm |
| Water for Solutions | 126 gm |
| Sodium Bisulfite | 6.8 gm |
| Water for Solutions | 126 gm |
| Core from Example 12A | 47.5 gm |

Proceed with the polymerization as in Example 3B with an initial monomer emulsion feed rate of 5 gm/minute. After 30 minutes of feed add 7.5 gm Alipal CO-436 in 25 gm water to the monomer emulsion and mix well. Following this increase monomer emulsion feed to 10 gm/minute and one hour later increase it to 15 gm/minute. The monomer feed should be completed in 245 minutes.

After cooling and filtering the solids level is 55.6% and the particle size is 0.50 microns spherical equivalent. The particles are about 60% triplets and quadruplets with about 30% doublets and the rest spheres.

EXAMPLE 15

Comparative Spherical Particle Dispersions

Spherical polymer particle dispersions for comparative purposes were prepared by a procedure similar to that of Example 1B with the following changes.

TABLE 31

| | |
|---|---|
| Monomer Emulsion | |
| Deionized Water | 600 gm |
| Alipal CO-436 | 3.35 gm |
| Butyl Acrylate | 1006.5 gm |
| Methyl Methacrylate | 908.6 gm |
| Acrylic Acid | 25.7 gm |
| Kettle Water Charge | 663 gm |
| Initial Catalyst | |
| $FeSO_4.7\ H_2O$ (1% Solution) | 1.5 gm |
| Ammonium Persulfate | 0.5 gm |
| Sodium Bisulfite | 0.5 gm |
| Cofeed Catalyst | |
| Ammonium Persulfate/$H_2O$ | 5.5 gm/100 gm |
| Sodium Bisulfite/$H_2O$ | 3.8 gm/100 gm |

To carry out the procedure the kettle water charge is heated to 60° C., a polymer seed is charged followed by the initial catalyst and subsequently by the monomer emulsion feed and catalyst cofeed. The reaction temperature is maintained at 60° C.

Three polymer dispersions are prepared with three different seed charges. The seed used is that which has been prepared in Example 6A.

TABLE 32

| | Final Dispersion | | |
|---|---|---|---|
| | A | B | C |
| Seed Charge | 16.4 | 38.8 | 30.6 |
| % Solids | 55.8 | 55.9 | 55.2 |
| Particle Diameter, microns | 0.90 | 0.70 | 0.77 |
| Viscosity, cps | 70 | 60 | 60 |

EXAMPLE 16

Comparison of Spherical and Multilobal Dispersions in a 40 PVC, 38% VS Paint

Various polymer dispersions are evaluated in the paint described in Example 4. As can be seen from Table 33, the multilobal dispersion provides higher paint ICI and better film build than conventional spherical dispersions.

TABLE 33

| Polymer Dispersion | Paint ICI | Paint Film Build |
|---|---|---|
| A. Spherical from Example 15B, 0.70 microns (comparative) | 1.75 | 11.9 |
| B. Spherical from Example 15A, 0.90 microns (comparative) | 1.80 | 13.2 |
| C. Multilobal product of Example 4, volume equivalent to a 0.75 micron sphere | 3.00 | 16.5 |

We claim:

1. An article of manufacture comprising a coating formed from an aqueous dispersion of multilobal polymer particles comprising a polymeric central core and at least two polymeric lobes on said polymeric core, said lobe polymer being compositionally different from said core polymer, and where the weight ratio of lobe polymer to core polymer ranges from about 2 to 1 to about 500 to 1.

2. A method of using an aqueous dispersion of multilobal polymer particles as a binder, coating, adhesive or component thereof, wherein said multilobal polymer particles comprise a polymeric central core and at least two polymeric lobes on said polymeric core, said lobe polymer being compositionally different from said core polymer, and where the weight ratio of lobe polymer to core polymer ranges from about 2 to 1 to about 500 to 1, comprising incorporating an effective concentration of said aqueous dispersion of said multilobal polymer particles in said binder, coating or adhesive or component thereof.

3. The method of claim 2 wherein the multilobal polymer particles comprise a weight ratio of said lobe polymer to core polymer of from about 50 to 1 to about 500 to 1.

4. The article manufacture of claim 1 wherein the multilobal polymer particles further comprise a weight ratio of said lobe polymer to core polymer of from about 50 to 1 to about 500 to 1.

5. A water-based paint comprising an effective amount of an aqueous dispersion of multilobal polymer particles comprising a polymeric central core and at least two polymeric lobes on said polymer core, said lobe polymer being compositionally different from said core polymer, and where the weight ratio of lobe polymer to core polymer ranges from about 2 to 1 to about 500 to 1.

* * * * *